United States Patent [19]

Jain

[11] Patent Number: 4,509,048
[45] Date of Patent: Apr. 2, 1985

[54] METHOD AND APPARATUS FOR $\Delta$K SYNTHETIC APERTURE RADAR MEASUREMENT OF OCEAN CURRENT

[75] Inventor: Atul Jain, La Canada, Calif.

[73] Assignee: The United States of America as represented by the Administrator of the National Aeronautics and Space Administration, Washington, D.C.

[21] Appl. No.: 359,382

[22] Filed: Mar. 18, 1982

[51] Int. Cl.$^3$ .............................................. G01S 13/90
[52] U.S. Cl. ................................. 343/5 CM; 343/5 W; 343/17.2 PC
[58] Field of Search .......... 343/5 CM, 5 W, 17.2 PC, 343/5 SA

[56] References Cited

U.S. PATENT DOCUMENTS

| | | | |
|---|---|---|---|
| 4,053,886 | 10/1977 | Wright et al. | 343/5 W X |
| 4,101,891 | 7/1978 | Jain et al. | 343/5 CM X |
| 4,172,255 | 10/1979 | Barrick et al. | 343/5 W |

FOREIGN PATENT DOCUMENTS 2063003  11/1980  United Kingdom ............. 343/5 W

OTHER PUBLICATIONS

Robert H. Stewart et al., "HF Radio Measurements of Surface Currents" Jun. 8, 1974, pp. 1039–1049, Deep Sea Research 1974, vol. 21.

Jain, A. (1977), "Determination of Ocean Wave Heights from Synthetic Aperture Radar Imagery," Applied Physics, vol. 13, pp. 371–372.

Schuler, D. L. (1978), "Remote Sensory of Directional Gravity Wave Spectrum and Surface Currents Using Microwave Dual-Frequency Radar," Radar Sciences vol. 13, pp. 321–331.

Plant, W. J. and Schuler, D. L. (1980), "Remote Sensing of the Sea Surface Using One- and Two-Frequency Microwave Techniques," Radar Sciences, vol. 15, pp. 605–615.

Primary Examiner—T. H. Tubbesing
Assistant Examiner—John B. Sotomayor
Attorney, Agent, or Firm—Paul F. McCaul; John R. Manning; Thomas H. Jones

[57] ABSTRACT

A synthetic aperture radar (10) is employed for $\Delta k$ measurement of ocean current from a spacecraft (11) without the need for a narrow beam and long observation times. The SAR signal is compressed (12) to provide image data for different sections of the chirp bandwidth, equivalent to frequencies $f_1(t_a,t)$, $f_2(t_a,t)$ ... $f_n(t_a,t)$, and a common area for the separate image fields is selected (14). The image for the selected area at each frequency is deconvolved (16) to obtain the image signals for the different frequencies ($f_1, f_2 \ldots f_n$) and the same area. A product of pairs of signals is formed (18, 20), Fourier transformed (22) and squared (24). The spectrum thus obtained from different areas for the same pair of frequencies $f_{jk}$, $f_{j+n,k}$ are added (26) to provide an improved signal to noise ratio. The shift of the peak from the center of the spectrum is measured and compared (28) to the expected shift due to the phase velocity of the Bragg scattering wave. Any difference is a measure of current velocity $v_c(\Delta k)$.

4 Claims, 4 Drawing Figures

METHOD AND APPARATUS FOR ΔK SYNTHETIC APERTURE RADAR MEASUREMENT OF OCEAN CURRENT

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to the use of a chirped synthetic aperture radar (SAR) to measure ocean current velocity from spacecraft, and more particularly to a SAR system for measurement of surface currents of the ocean from the ocean wavelength of $2\pi/\Delta k$, where $\Delta k$ is the difference in wavenumber between two frequencies $f_1$ and $f_2$ of a chirped SAR.

Surface currents of the ocean vary widely from the current velocity below about one meter due to local surface wind and wave fields that differ from the normal waves resulting from geostrophic forces and tides. It would be desirable to map the deeper ocean current velocity from a spacecraft not only for climate prediction in coastal areas, but also for navigation and management of fishing operations.

Previous work has shown that $\Delta k$ radar techniques can measure current velocities, and determine dominant wavelengths, based on the fact that if the Bragg angle $\theta$ between the incoming radiation and the mean surface is larger than the rms surface slope, but smaller than about 70°, microwave scattering is well defined by the Bragg law, as discussed by W. J. Plant and D. L. Schuler in a paper titled "Remote sensing of the sea surface using one- and two-frequency microwave techniques" published in Radio Science 15, 605 (1980).

In that paper, the authors describe a dual-frequency technique. Two coherent microwave signals are transmitted from a stationary CW radar, and signals scattered from the same spot at the two frequencies are multiplied to produce a spectrum with a sharp line, the $\Delta k$ line. The authors show that for a narrow beam and relatively long observation times, a dual-frequency system may thus be used to measure current velocities and determine dominant wavelengths.

SUMMARY OF THE INVENTION

An object of this invention is to use the $\Delta k$ technique for determining ocean current velocities using a chirped SAR signal from a spacecraft radar system, without the need for a narrow beam and long observation times.

In accordance with the present invention, chirped synthetic aperture radar signals $S(t_a,t)$ are first compressed to provide signals $e_j(t_{ao},t_o)$ for different sections of the chirp bandwidth equivalent to signals obtained for different frequencies $f_1(t_a,t), f_2(t_a,t) \ldots f_n(t_a,t)$, where $S(t_a,t)$ represent distinct chirped radar input signals at times $t_a$ and $t$, i.e., where $S(t_a,t)$ is a two-dimensional signal. A common area, K, for the separate image fields is selected to produce signals $\hat{e}_{jk}(t_{ao},t_o)$, where the cap (^) over the e indicates the total signal from area. The cap, which is then carried over all symbols for subsequent signals carries the same meaning. Note that the upper case letter K used for area does not refer to the $\Delta k$ Bragg wave, and that the lower case letter k in subscripts refers to this area K, but that $\Delta k$ does refer to difference in the wavenumber of an ocean wave of wavelength related to $2\pi/\Delta k$. The common rectangular area, K, is of dimensions $l_{ok} \times l_{ok}$ centered at $t_{aok}, t_{ok}$ for the separate image fields at the different frequencies. The image $\hat{e}_{jk}(t_{ao},t_o)$ is deconvolved to obtain the signals $\hat{S}_{jk}(t_{ao},t_o)$ for the different frequencies and the same area. A product of pairs of signals $\hat{S}_{jk}$ and $\hat{S}_{j+n,k}$ is then produced that is a two-dimensional signal function of $\Delta k$ and $t_{ao}, t_o$. The product is processed through a Fast Fourier Transform (FFT) and a squarer. The process is repeated for different areas of the same frequencies. The spectrum thus obtained for different areas using the same pair of frequencies are added to provide an improved signal to noise ratio for the spectrum. A Doppler shift $f_D$ of the spectrum peak from the center of the spectrum is compared to the expected Doppler shift due to the phase velocity $v_p = \sqrt{g/\Delta k}$ of the Bragg scattering wave, i.e., actual velocity without current where g is the acceleration due to gravity. This difference is due to the current velocity $v_c(\Delta k)$ as effecting the ocean wavelength of $2\pi/\Delta k$. In other words, from the equation $$f_D = f_R \frac{V(\Delta k)}{C}$$

where $f_R$ is the radar frequency and C is the speed of light, the total velocity $V(\Delta k)$ is determined. The radial component of velocity $v_c(\Delta k)$ is then determined from the equation $V(\Delta k) = v_p + v_c(\Delta k)$.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
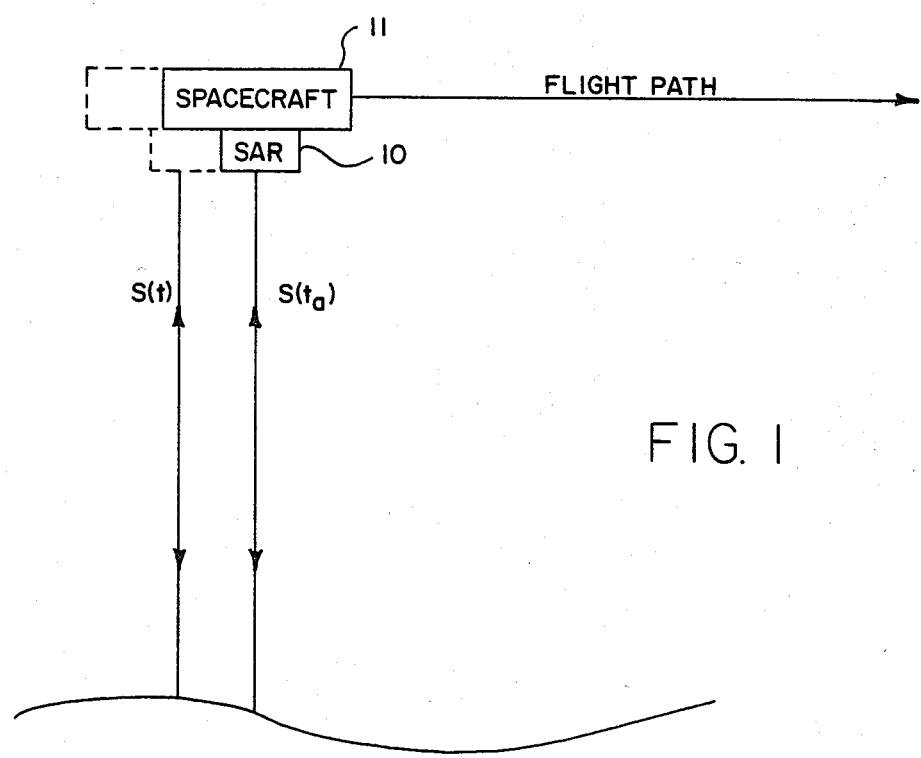
FIG. 1 illustrates a spacecraft having a chirped synthetic aperture radar (SAR) illuminating the ocean for the purpose of determining the ocean current from the $\Delta k$ Bragg condition.

Referring to FIG. 1, the chirped side looking synthetic aperture radar 10 is carried by a spacecraft 11 over the ocean. As shown, the input signals $S(t_a)$ and $S(t)$ appear to be vertical, but in practice will be at a slant angle $\beta$ that is the complement $(90° - \theta)$ of the Bragg angle $\theta$ between the incoming radiation and the mean surface, where $\theta$ is larger than the rms surface slope, but smaller than about 70° as shown in an end view in FIG. 2, i.e., shown in a view looking in the direction of the spacecrafts flight path. The SAR signal is processed to provide images for different sections of the chirp bandwidth, equivalent to images obtained for different frequencies. A common area for the separate image fields is selected and the image deconvolved to obtain the signal for different frequencies and the same area. A product of pairs of signals is Fourier transformed and squared, and the spectrum thus obtained for different images for the same pair of frequencies added to provide an improved signal to noise ratio. The shift of the peak from the center of the spectrum is determined and compared to the expected shift due to the phase velocity of the Bragg scattering wave. Any difference is due to the radial component of the current velocity as affecting the ocean wavelength, and thus a measure of ocean current.

Figure 2:
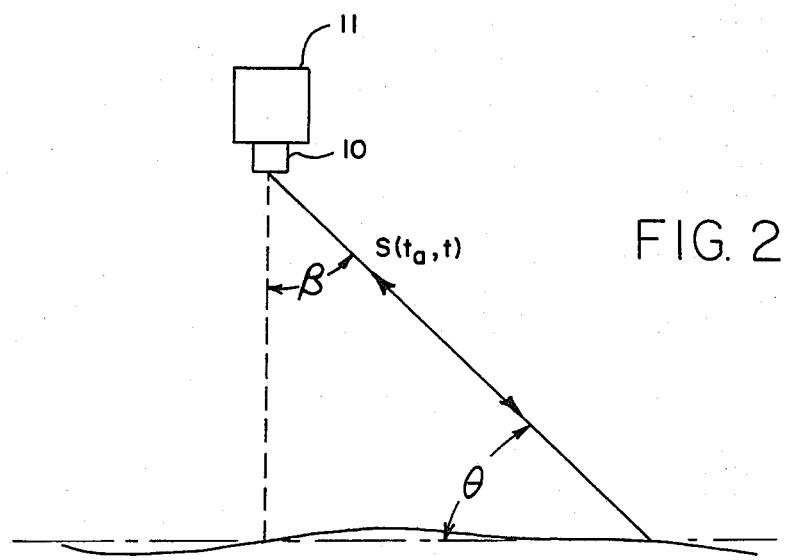
FIG. 2 illustrates the diagram of FIG. 1 looking in the direction of the spacecraft flight path.

For simplicity, only the dominant waves of deeper ocean currents due to geostrophic forces and tides are shown in FIGS. 1 and 2, it being understood that surface waves due to winds and other factors are also present and contribute to the input signal $S(t_a,t)$. However, these surface waves to not interfere with measurement of the ocean currents by this SAR system which effectively obtains a narrow beam using SAR processing and a high signal to noise ratio using spatial averaging.

Figure 3:
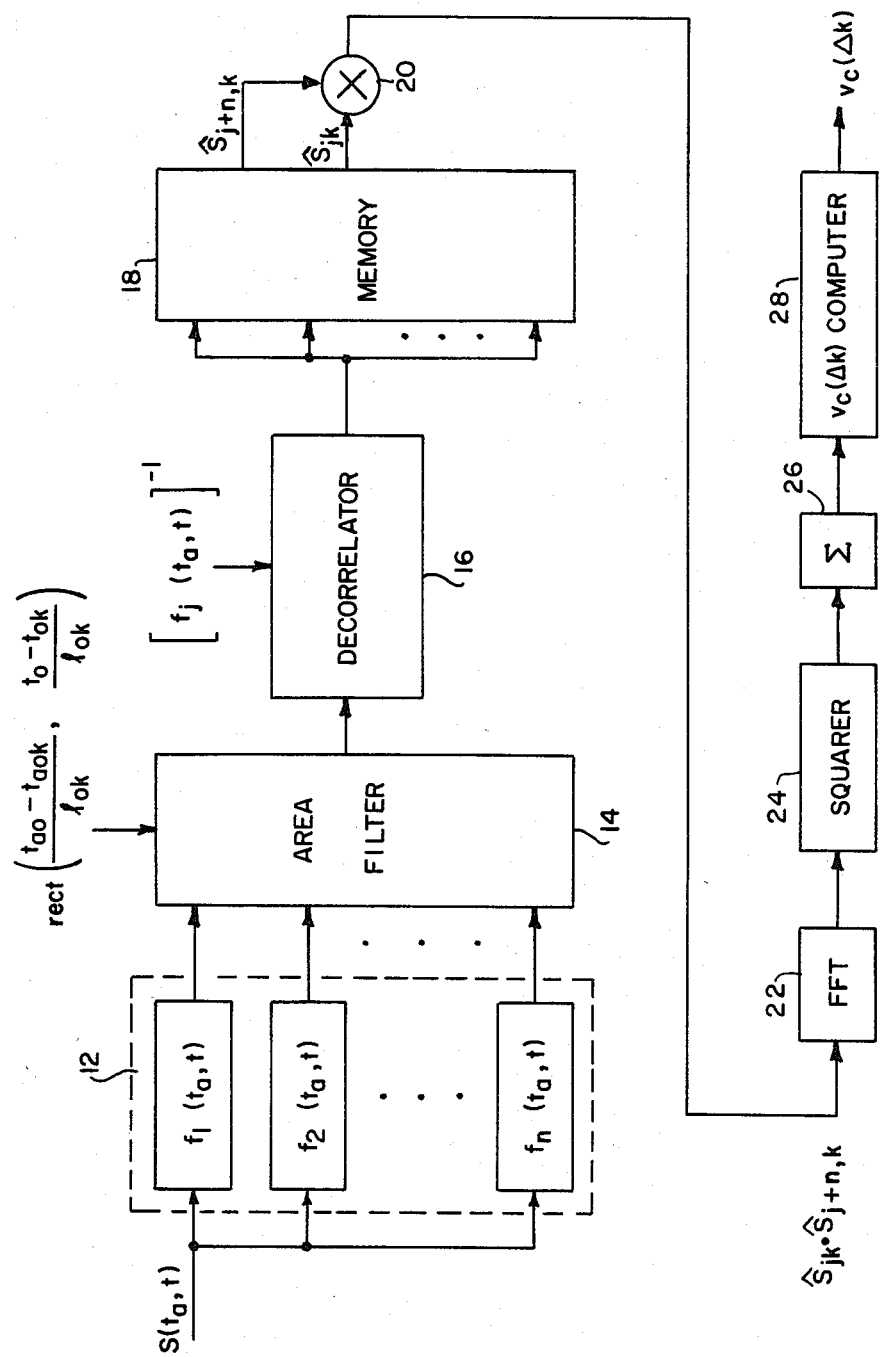
FIG. 3 is a functional block diagram of a $\Delta k$ SAR processor in accordance with the present invention.

FIG. 3 illustrates the SAR processing system of the present invention in a functional block diagram, although all functions, except possibly the first, may be carried out by a programmed digital computer. The signal $S(t_a,t)$ is first compressed by matched filters 12. This achieves range and azimuth correlation in a conventional manner. The combined operation of these matched filters is represented by the first mathematical operation 12' in FIG. 4 of correlating the input signal $S(t_a,t)$ with a matched filter function $f_j(t_a,t)$ to process the input signal at chirp center frequency $f_{cj}$.

Figure 4:
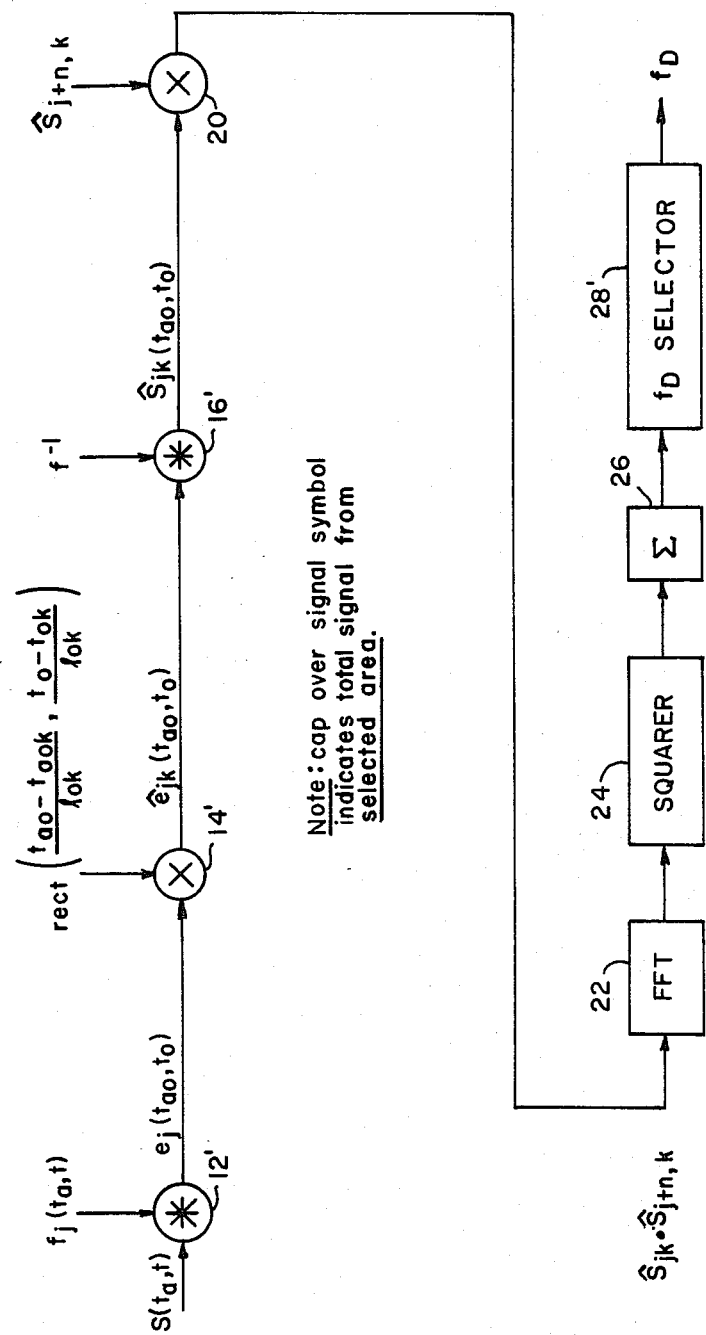
FIG. 4 is a mathematical flow chart for the operations of the processor of FIG. 1 which may be carried out in a digital SAR processor.

The outputs $e_j(t_{ao},t_a)$ from the matched filters are then processed through an area filter 14 represented in FIG. 4 by the aperture function 14' where $(t_{ao}-t_{aok})/l_{ok}$, $(t_o-t_{ok})/l_{ok}$ represents a small rectangular area in the image to be processed that is a square of length $l_{ok}$ centered at a point defined by radar times $t_{aok},t_{ok}$ in the two-dimensional signal $S(t_{ao},t_o)$. The result $\hat{e}_{jk}(t_{ao}, t_o)$ for one small area at one wavenumber, $k_1$, is then decorrelated in block 16 with the inverse matched filter function for the input signal, and the process is repeated for all of the other wavenumbers $k_2 \ldots k_n$ corresponding to the frequencies of the matched filters. That decorrelation for each wave number is represented in FIG. 4 by the third mathematical operation 16' where the inverse matched filter function is represented by $f^{-1}$.

Since the procedures of the second and third mathematical operations (indicated in FIG. 4) are repeated (in the apparatus represented by the blocks 14 and 16 in FIG. 3) for the same small area at different frequencies $f_1, f_2 \ldots f_n$, it is necessary for the results to be stored. A memory 18 is indicated in FIG. 3 for this purpose. There is no corresponding memory indicated in FIG. 4, it being understood.

The next operation represented in FIG. 3 by a symbol 20 is to multiply a pair of signals from the preceding operation, such as the signal $\hat{S}_{jk}(t_{ao},t_o)$ for the line $k_1$ (frequency $f_1$) with the corresponding signal for the line $k_2$, and then multiply the signal for the line $k_1$ with the signal for the line $k_3$, etc., until every signal has been multiplied by the signal from line $k_1$ to form the product of signal pairs $\hat{S}_{jk}, \hat{S}_{j+n,k}$. This operation of multiplying signals in pairs is represented in FIG. 4 by a similar multiplication symbol 20'. The products are then transformed by a Fast Fourier Transform (FFT) 22 and processed through a squarer 24 shown in FIG. 3. These two mathematical operations are similarly represented in FIG. 4 by functional blocks 22 and 24. The output of the squarer is the spectrum of the input signal corresponding to one area.

The corresponding results for each pair of frequencies (i.e., each $\alpha k$) of the different images (areas) are summed in block 26 of FIG. 3 to increase the signal to noise ratio of the system. That is represented by the same summing function block 26 in the flow chart of FIG. 4. In other words, the block 26 labeled $\rightarrow$ sums the squares of the products $\hat{S}_{jk}$, $\hat{S}_{j+n,k}$ for different areas.

The last operation 28' labeled $f_D$ SELECTOR in the flow chart of FIG. 4 is to determine the magnitude of Doppler shift $f_D$ of the output signal from the summing operation 26 for any one pair of frequencies for different images (areas). The shift determined is of the $\Delta k$ spectral line of one pair of frequencies from the center of the spectrum. From that shift the ocean current velocity is calculated. This complete calculation is represented in the functional block diagram of FIG. 3 by a block 28 labeled $v_c(\Delta k)$ COMPUTER.

From the foregoing, it is evident that the system of the present invention utilizes conventional SAR data and processes it to provide images for different sections of the chirp bandwidth, equivalent to images obtained for different frequencies. A common small area for the separate image fields is selected, and the image is deconvolved to obtain the signal for the different frequencies and same area. A product of pairs of signals are Fourier transformed and squared. The spectrum thus obtained for different images (areas), but for the same pair of frequencies, are added for improved signal to noise ratio.

The spectrum for one area image provides a peak shifted from the center by an expected amount due to the phase velocity $v_p = \geq g/\overline{\Delta k}$ of the Bragg scattering wave without current, where g is the acceleration due to gravity, and $\Delta k$ is the chirp center frequency difference for the paired signals $\hat{S}_{jk}$ and $\hat{S}_{j+n,k}$. Any difference in the amount the peak is shifted from the center of the spectrum more than the expected amount is due to the radial component of current velocity $v_c(\Delta k)$ as effecting the ocean wavelength of $2\pi/\Delta k$.

Computing $v_c(\Delta k)$ is carried out, once $f_D$ is determined, in the following manner. First it is recalled that the phase velocity $v_p$ of the ocean surface is known to be equal to $\sqrt{g/\Delta k}$, and that the total velocity indicated by the Doppler shift $f_D$ is given by the following equation $$f_D = f_R \frac{V(\Delta k)}{C}$$

where $f_R$ is the radar frequency, C is the speed of light. It is also known that $V(\Delta k) = v_p + v_c(\Delta k)$. If $V(\Delta k)$ is thus determined from the Doppler shift and $v_p$ is calculated, the radial component of velocity $v_c(\Delta k)$ of the ocean current resulting from geostrophic forces and tides is determined. It is thus seen that the computer 28 of FIG. 3 performs only simple arithmetic operations once $f_D$ is determined. The same computations can be carried out for each of the other pairs of signals which define a $\Delta k$, and the computed $v_c(\Delta k)$ of each calculation compared or averaged with other calculations for greater accuracy.

The velocity computer 28 operates by effectively picking out the Doppler shift $f_D$ by a procedure that is the equivalent of plotting the Doppler shifted output signal from the squarer, and preferably by plotting the sum of such signals over different areas to improve signal to noise ratio, as just noted above. The computer calculates $V(\Delta k)$ and $v_p$, and then determines ocean current from the equation:

$$V(\Delta k) = v_p + v_c(\Delta k)$$

This may be converted to ocean current depth profile by the relationship:

$$v_c \Delta k = 4k \int_0^\infty \mu(z) e^{-4\Delta k z} dz$$

where z is the depth coordinate and $\mu(z)$ is the current dependence on depth.

Although particular embodiments of the invention have been described and illustrated herein, it is recognized that variations and equivalents may readily occur to those skilled in the art. Consequently, it is intended that the claims be interpreted to cover such variations and equivalents.

What is claimed is:

1. A method for measurement of ocean current using a chirped synthetic aperture radar which transmits periodic pulses of predetermined chirp bandwidth toward the ocean at an angle $\beta$ that is the complement of the Bragg angle $\theta$, and receives return signals, $S(t_a,t)$, comprising the steps of compressing said signals $S(t_a,t)$ to provide signals $e_j(t_{ao},t_o)$ for different sections of said bandwidth, selecting a small common area for separate image fields at the different sections of said bandwidth in the signals $e_j(t_{ao},t_o)$ to produce image signals $e_{jk}(t_{ao},t_o)$ for the common area, deconvolving the signals $e_{jk}(t_{ao},t_o)$ to produce different signals for the different frequencies of said bandwidth, but of the same common area, producing a signal $\hat{s}_{jk} \cdot \hat{s}_{j+n,k}$ that is a product of pairs of signals from the previous step, Fourier transforming and squaring the signal thus obtained from the preceding step to produce a spectrum, determining the Doppler shift $f_D$ of the spectrum peak from the center of said spectrum, and comparing said Doppler shift $f_D$ to the Doppler shift expected due to the phase velocity $v_p$ of the Bragg scattering wave to obtain ocean current velocity $v_c(\Delta k)$ from the difference between the expected Doppler phase shift and the determined Doppler phase shift.

2. A method as defined by claim 1 wherein the entire process is repeated, each time for a different common area, but with the same pairs of frequencies in the signal $\hat{s}_{jk} \cdot \hat{s}_{j+n,k}$, and the spectra thus obtained for different areas using the same pairs of frequencies are added to provide improved signal to noise ratio for the spectrum used to determine the Doppler shift $f_D$.

3. Apparatus for measurement of ocean current using a chirped synthetic aperture radar which transmits periodic pulses of predetermined chirp bandwidth toward the ocean at an angle $\beta$ that is the complement of the Bragg angle $\theta$, and receives return signals $S(t_a,t)$, comprising means for compressing said signals $S(t_a,t)$ to provide image signals $e_j(t_{ao},t_o)$ for different sections of said bandwidth, means for selecting a common area for separate image fields at the different sections of said bandwidth in the signals $e_j(t_{ao},t_o)$ to produce image signals $e_{jk}(t_{ao},t_o)$ for the common area, means for deconvolving the signals $e_{jk}(t_{ao},t_o)$ to produce different signals for the different frequencies of said bandwidth, but of the same common area, means for producing a signal $\hat{s}_{jk} \cdot \hat{s}_{j+n,k}$ that is a product of said pair of signals from said deconvolving means, means for Fourier transforming and squaring the signal thus obtained from said means for producing a spectrum from said signal $\hat{s}_{jk} \cdot \hat{s}_{j+n,k}$, means for determining the Doppler shift $f_D$ of the spectrum peak from the center of said spectrum, and means for comparing said Doppler shift $f_D$ to the expected Doppler shift due to the phase velocity $v_p$ of the Bragg scattering wave to obtain ocean current velocity $v_c(\Delta k)$ from the difference between the expected Doppler phase shift and the determined Doppler phase shift.

4. Apparatus as defined in claim 3 wherein said apparatus repeats operation, each time for a different common area, but with the same pairs of frequencies in the signal $s_{jk} \cdot s_{j+n,k}$, and includes means for adding the spectra thus obtained for different areas using the same pair of frequencies to provide improved signal to noise ratio for the spectrum used to select the Doppler shift $f_D$.

* * * * *